Nov. 5, 1957    A. W. BUCK    2,811,910
FILM SUPPORTING FRAME
Filed Aug. 26, 1955
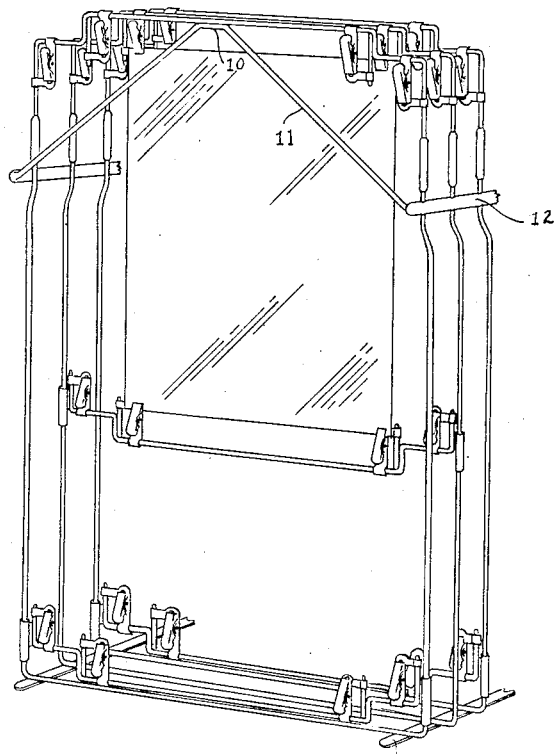
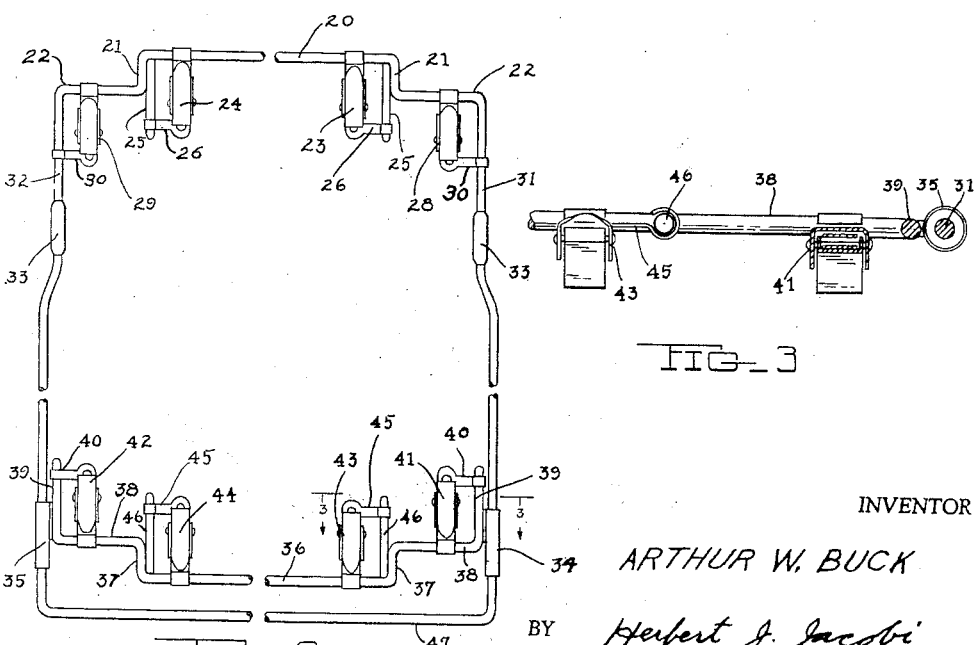
INVENTOR
ARTHUR W. BUCK
BY Herbert J. Jacobi
ATTORNEY United States Patent Office 2,811,910
Patented Nov. 5, 1957

2,811,910

FILM SUPPORTING FRAME

Arthur W. Buck, St. Louis, Mo., assignor to Buck X-Ograph Company, St. Louis, Mo., a corporation of Missouri Application August 26, 1955, Serial No. 530,718

4 Claims. (Cl. 95—100)

This invention relates to adjustable frames and is particularly concerned with frames adjustably adapted to support and retain in taut position, sheet material, such as X-ray film. While certain aspects of the present inventive concept may be broadly applicable, the present illustrative embodiment relates to the development and processing of X-ray film and provides a universal device adapted to properly maintain various sizes of film in appropriate condition for processing.

Heretofore, X-ray films have been mounted for processing on frames individually formed to fit the size of film being processed. Therefore, individual frames for the individual sizes of films were required. Such multiplicity of individual frame sizes were not only expensive, but their use involved the mechanical operation of selecting the appropriate size, as well as the storage and maintenance of pluralities of each required size. Since, standard X-ray films are conventionally of four different sizes, 8 x 10, 10 x 12, 11 x 14 and 14 x 17, it will be seen, that a universal frame adjustable to meet the requirements of each size will reduce the total required stock of frames to one-fourth, in addition to avoiding any necessity of size selection by the technician. Furthermore, frames previously furnished were of an individual nature, each frame requiring individual handling as the film was developed, rinsed, fixed and washed. By the use of an adjustable frame accommodating all four standard film sizes, batteries of unitized frames may be provided for the processing in a single operation of a multiplicity of various standard sized films.

It is therefore, among the primary and general objects of the present invention to provide a novel and improved frame particularly adapted for the processing of film, such as X-ray film.

Another primary and general object of the present invention is to provide a unitized battery or assembly of frames for the development of X-ray film.

More specifically, it is among the objects of the present invention to provide a frame of the character set forth, having adjustable means for gripping and retaining sheet material of a variety of sizes so that such frame may accommodate a number of different sizes of standard sheets.

A further specific object of the present invention is to provide a unitized assembly of adjustable frames whereby a plurality of various sizes of sheets may be processed in a single manipulation of the device.

It is also among the objects of the present invention to provide a rigid and permanent assembly of adjustable frames particularly adapted for the support and retention of X-ray film of various sizes in adequately spaced relation whereby they may be processed as a unit by the manipulation of the frame.

Numerous other objects, features and advantages of the present invention will be apparent from a consideration of the following specification taken in conjunction with the accompanying drawings in which:

Fig. 1, is a perspective view of one preferred embodiment of the present invention;

Fig. 2, is a plan view of one of the frames of the unitized construction of Fig. 1; and Fig. 3 is a sectional view taken on the line 3—3 of Fig. 2.

While the present invention is, in no way restricted nor limited to the structural details and sizes or size relationship herein presented, the present form of the invention may be briefly characterized as comprising a generally rectangular frame of suitable substantially rigid material, here suggested as round metal stock. At one end of the frame, preferably the top, two sets of film engaging clips are provided, the inner pair being adapted to engage the outer corners of film having one dimension of, for instance, ten inches, while the outer pair are to secure the outer corners of film having one dimension of, for instance, fourteen inches. Slidably arranged upon the side bars of the frame, there is mounted a floating or adjustable member upon which is likewise, mounted four clips corresponding to those of the opposed frame end and adapted to selectively engage the opposite outer corners of films the other end of which is already engaged. As here presented, the clip bearing end and the adjustable member are formed with inwardly spaced central sections for the clips to retain the smaller films so that such films will be arranged in displaced parallel relation with respect to the larger films to facilitate handling and processing. The slidably mounted clips of the frame of my present invention may be of various types, but are preferably formed in accordance with the teachings of my prior Patent No. 1,955,575, granted April 17, 1934.

The frame of the present invention thus broadly defined, may be used as an individual unit, thus providing a universal frame avoiding the necessity of stocking individual frames for each individual size of film used. However, the invention contemplates and embraces the concept of a fixed, rigid and unitized battery of such frames, wherein the frames are coupled as by an upper handling structure inter-engaging the individual frames and securing them in rigid spaced parallel relation and a lower pair of feet or supports similarly engaging the frames.

Referring now to the details of construction of that form of the invention presented by the drawing, it will be seen, from Fig. 1, that the individual generally rectangular frame units depicted in detail in Figs. 2 and 3, and hereinafter further discussed, may be unitized by the provision of a top interconnecting and handling member comprising a pair of end members including horizontal upper and central bars 10, joined to the central portion of the upper ends of the outer frames of the group. The ends of the bars 10 turn downwardly and outwardly at 11 to engage parallel side rails 12 which are united with the side members of each of the frames of the battery. As will be readily seen, the opposite disposition of the side rails rigidly engaged with the side members of each of the individual frames secures the frames in rigid equally spaced relation. The central bars 10 engaging the central portions of the top of the outermost frames assist in the unitizing of the frame assembly while the downwardly and outwardly inclined portions 11 brace the assembly against flexibility and weaving.

The individual frames are further unitized by the provision of a pair of spaced base or support bars 14 mounted in parallel relation and rigidly secured to the transverse lower ends of each of the frames of the group. The base bars 14 are arranged between the individual frames in parallel relation to the side rails 12 and preferably at the extreme transverse ends of the lower ends of the frames to provide a wide and ample base which may support the assembly while fully loaded in upright position. The structure is thus self-supporting, while in or out of the processing tanks used in the development of film. Obviously, in conjunction with the top interconnecting member, the base bars insure a permanent spaced parallel relation between the frames precluding inadvertent relative movement therebetween.

Referring now to Figs. 2 and 3, the individual frames themselves comprise upper or top cross members including central straight portions 20 and downward bends 21 which joint outer ends 22 of the tops. Mounted on the central portion 20 are clips 23 and 24, each secured as by mounting pins 25 to one of the opposite bends 21. The clips 23 and 24 are inwardly spaced from the bends 21 by brackets 26, thus to be engageable with film of less width than the portion 20 or with film of substantially equal width. The clips preferred for use with the present frame are of the type of my prior patent, above referred to, and, in themselves, form no part of the present invention. Suffice it, therefore, to say, that manually operable spring jaw clips are here contemplated and that such clips are secured in fixed relation on the portion 20 inwardly spaced from the opposite ends thereof. Similar clips 28 and 29 are secured upon the downwardly stepped outwardly extending ends 22 being secured by brackets 30 corresponding to the brackets 26.

Downwardly extending from the extreme ends of the portions 22 are the side bars 31 and 32 including unions 33 by which the manufacture of such side bars from individual lengths of material is facilitated. Below the unions 33, the side bars flare outwardly slightly to insure ample width therebetween, at the lower ends of the frames. Slidably mounted on each of the side bars 31 and 32 are sleeves 34 and 35 between which is mounted the lower floating or adjustable film engaging member. The adjustable member is the counterpart of the upper end including a central straight section 36, parallel and equal to the portion 20, downward bends 37 and outer ends 38. In this instance, the ends 38 are formed with vertical terminals 39 corresponding to the pins 25 and on which the brackets 40 of outer lower clips 41 and 42 are secured. Inner lower clips 43 and 44 are secured by brackets 45 to mounting pins 46. By this arrangement, it will be seen, that the two pairs of lower clips may be raised or lowered on the side bars to accommodate various lengths of film suspended from the upper clips. The free slidability of the adjustable member not only provides ready adjustment thereof for the accommodation of various lengths of film, but further provides a gentle tension of film suspended from above, thus maintaining such film duly taut during processing. The frame is completed by the provision of an integral bottom rung 47 uniting the sides 31 and 32.

It is proposed that the transverse spacing of the inner clips 23 and 24 is approximately ten inches. Thus, these clips may secure therebetween the ten inch dimension of a film. In so doing, the adjustable member may be raised to conform with the corresponding eight or twelve inch length of an 8 x 10 or 10 x 12 inch film. Similarly, the outer clips 28, 29, 41 and 42 constitute a rectangle and the transverse spacing will be approximately fourteen inches. The inner spacing of the clips from the side rails 33 will, of course, be such, as to accomodate the fourteen inch width between the sides, regardless of the inward spacing of the clips. Thus, in the use of the device, the fourteen inch width of film 17 inches long may be suspended from the outer clips, while the adjustable member is disposed 17 inches below the clips 28 and 29. This arrangement may also, give a selection for securement of the 11 x 14 inch film which may be disposed lengthwise across the frame by securement to the outer clips, the adjustable member being raised to eleven inches from the clips 28 and 29.

Therefore, from the foregoing, it will be seen, that the present invention provides a novel, simple and improved universally adjustable frame particularly adapted to mount the four standard sizes of X-ray film. It is, of course, understood, that the invention is in no way limited to this use or to the dimensions, here suggested, as appropriate for that use. It will also be seen, that the present frame will secure the film or equivalent sheet in taut position so as to facilitate its use in developing, rinsing, fixing or washing film or for other types of operation on other materials. It will further be seen, that in their unitized relation, as shown in Fig. 1, the assembly may be used in the simultaneous processing of a plurality of standard sized films or like sheets. Hence, the invention will function to very materially reduce the operators time, otherwise consumed in individually processing separate sheets or films or groups of films of uniform size. It will be understood, of course, that the invention is in no way limited to the specific structural details herein presented, or to the dimensions or relationship of dimensions here suggested. Thus, numerous changes, modifications and the full use of equivalents may be resorted to in the practice of the invention without departure from the spirit or scope thereof, as outlined in the appended claims.

What is claimed is:

1. A film supporting frame of generally rectangular configuration and comprising spaced substantially parallel side bars, a lower substantially straight cross bar connecting said side bars, an upper cross bar connecting said side bars and having an upwardly offset substantially straight upper central portion and spaced upper side portions, a pair of upper inner spaced film engaging clips depending from said upper central portion, a pin extending downwardly from said upper cross bar adjacent each upper inner clip, a bracket connecting each upper inner clip to the adjacent pin, a pair of upper outer spaced film engaging clips descending from said upper side portions in spaced relations to said side bars, a bracket connecting each upper outer clip to the adjacent side bar, an intermediate cross bar extending between and slidably mounted on said side bars for movement toward and away from said upper cross bar, said intermediate cross bar having a downwardly offset substantially straight lower central portion in alignment with said upper central portion and spaced lower side portions in alignment with said upper side portions, a pair of lower inner spaced film engaging clips extending upwardly from said lower central portion in alignment with said upper inner clips, a pin extending upwardly from said intermediate cross bar adjacent each lower inner clip, a bracket connecting each lower inner clip to the adjacent pin, a pair of lower outer spaced film engaging clips extending upwardly from said lower side portions in spaced relation to said side bars and in alignment with said upper outer clips, said intermediate cross bar having an upwardly extending part adjacent each lower outer clip and a bracket connecting each lower outer clip to the adjacent upwardly extending part whereby film sheets of different sizes may be selectively secured between said upper and lower inner pairs of clips or between said upper and lower outer pairs of clips with said intermediate cross bar positioned in accordance with the length of said film between said clips.

2. A film supporting frame of generally rectangular configuration and comprising spaced substantially parallel side bars, a lower substantially straight cross bar connecting said side bars, an upper cross bar connecting said side bars and having an upwardly offset substantially straight central portion and spaced upper side portions, a pair of upper inner spaced film engaging clips depending from said upper central portion, a pair of upper outer spaced film engaging clips depending from said upper side portions in spaced relation to said side bars, an intermediate cross bar extending between and slidably mounted on said side bars for movement toward and away from said upper cross bar, said intermediate cross bar having a downwardly offset substantially straight lower central portion in alignment with said upper central portion and spaced lower side portions in alignment with said upper side portions, a pair of lower inner spaced film engaging clips extending upwardly from said lower central portion in alignment with said upper inner clips and a pair of lower outer spaced film engaging clips extending upwardly from said lower side portions in spaced relation to said side bars and in alignment with said upper outer clips whereby film sheets of different sizes may be selectively secured between said upper and lower inner pairs of clips or betwen said upper and lower outer pairs of clips with said intermediate cross bar positioned in accordance with the length of said film between said clips.

3. A film supporting frame of generally rectangular configuration and comprising spaced substantially parallel side bars, a lower cross bar connecting said side bars, an upper cross bar connecting said side bars and having an upwardly offset central portion and spaced upper side portions, a pair of upper inner spaced film engaging clips depending from said upper central portion, a pair of upper outer spaced film engaging clips depending from said upper side portions in spaced relation to said side bars, an intermediate cross bar extending between and slidably mounted on said side bars for movement toward and away from said upper cross bar, said intermediate cross bar having a downwardly offset lower central portion in alignment with said upper central portion and spaced lower side portions in alignment with said upper side portions, a pair of lower inner spaced film engaging clips extending upwardly from said lower central portion in alignment with said upper inner clips and a pair of lower outer spaced film engaging clips extending upwardly from said lower side portions in spaced relation to said side bars and in alignment with said upper clips whereby film sheets of different sizes may be selectively secured between said upper and lower inner pairs of clips or between said upper and lower outer pairs of clips with said intermediate cross bar positioned in accordance with the length of said film between said clips.

4. A film supporting frame of generally rectangular configuration and comprising spaced substantially parallel side bars, a lower cross bar connecting said side bars, an upper cross bar connecting said side bars, a pair of upper inner spaced film engaging clips depending from said upper cross bar, a pair of upper outer spaced film engaging clips depending from said upper cross bar between said inner clips and said side bars, said upper outer clips extending below said upper inner clips, an intermediate cross bar extending between and slidably mounted on said side bars for movement toward and away from said upper cross bar, a pair of lower inner spaced film engaging clips extending upwardly from said lower cross bar in alignment wtih said upper inner clips and a pair of lower outer spaced film engaging clips extending upwardly from said intermediate cross bar between said lower inner clips and said side bars in alignment with said upper outer clips, said lower outer clips extending above said lower inner clips whereby film sheets of different sizes may be selectively secured between said upper and lower inner pairs of clips or between said upper and lower outer pairs of clips with said intermediate cross bar positioned in accordance with the length of said film between said clips.

References Cited in the file of this patent

UNITED STATES PATENTS

| | | |
|---|---|---|
| 1,088,906 | Knoblauch | Mar. 3, 1914 |
| 1,463,710 | Matson | July 31, 1923 |
| 1,929,283 | Miller | Oct. 3, 1933 |
| 2,489,892 | Jenkins | Nov. 29, 1949 |
| 2,533,664 | De Lacy | Dec. 12, 1950 |
| 2,655,849 | White et al. | Oct. 20, 1953 |

FOREIGN PATENTS

| | | |
|---|---|---|
| 976,333 | France | Oct. 25, 1950 |